(12) United States Patent
Kunz et al.

(10) Patent No.: US 11,706,669 B2
(45) Date of Patent: Jul. 18, 2023

(54) VOICE SESSION HANDOVER BETWEEN MOBILE NETWORKS WITH DIFFERENT NETWORK TECHNOLOGIES

(71) Applicant: LENOVO (BEIJING) LIMITED, Beijing (CN)

(72) Inventors: Andreas Kunz, Ladenburg (DE); Genadi Velev, Darmstadt (DE); Roozbeh Atarius, La Jolla, CA (US); Zhuoyun Zhang, Beijing (CN); Dimitrios Karampatsis, Middlesex (GB)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/045,737

(22) PCT Filed: Apr. 6, 2018

(86) PCT No.: PCT/CN2018/082091
§ 371 (c)(1),
(2) Date: Oct. 6, 2020

(87) PCT Pub. No.: WO2019/192015
PCT Pub. Date: Oct. 10, 2019

(65) Prior Publication Data
US 2021/0029594 A1    Jan. 28, 2021

(51) Int. Cl.
*H04W 36/00* (2009.01)
*H04W 36/14* (2009.01)
*H04W 36/18* (2009.01)

(52) U.S. Cl.
CPC ... *H04W 36/0022* (2013.01); *H04W 36/0066* (2013.01); *H04W 36/14* (2013.01); *H04W 36/18* (2013.01)

(58) Field of Classification Search
CPC ............ H04W 36/0022; H04W 36/14; H04W 36/0066; H04W 48/18; H04W 36/08; H04W 36/0094; H04W 36/0072
See application file for complete search history.

(56) References Cited

U.S. PATENT DOCUMENTS

2010/0040020 A1   2/2010   Chen
2010/0098028 A1   4/2010   Wu
(Continued)

FOREIGN PATENT DOCUMENTS

| EP | 2882225 A1 | 6/2015 |
| WO | 2018006017 A1 | 1/2018 |
| WO | WO-2019071877 A1 * | 4/2019 |

OTHER PUBLICATIONS

Ericsson, "EPS Fallback for voice further enhancements", S2-182290, Telefonaktiebolaget L M Ericsson, 3GPP TSG-SA WG2 Meeting #126, Feb. 26-Mar. 2, 2018, pp. 1-10.
(Continued)

*Primary Examiner* — Allahyar Kasraian
(74) *Attorney, Agent, or Firm* — Kunzler Bean & Adamson

(57) ABSTRACT

Apparatuses, methods, and systems are disclosed for voice session handover. One method (800) includes receiving (802) a handover message including first information indicating a voice handover request to handover a voice session from a first network to a second network. The method (800) includes determining (804) a first network function configured to facilitate communication with the second network. The method (800) includes transmitting (806) a relocation request message to the first network function, wherein the relocation request message includes second information related to the voice handover request. The method (800) includes receiving (808) a relocation response message from the first network function, wherein the relocation response
(Continued)

message indicates completion of a voice handover. The method (800) includes transmitting (810) third information related to the voice handover to a third network function, wherein the third network function suspends non-guaranteed bit rate data flows.

9 Claims, 11 Drawing Sheets

(56) References Cited

U.S. PATENT DOCUMENTS

| | | | |
|---|---|---|---|
| 2017/0289898 A1 | 10/2017 | Youn et al. | |
| 2019/0182718 A1* | 6/2019 | Shan | H04W 60/04 |
| 2019/0297538 A1* | 9/2019 | Keller | H04W 36/0022 |
| 2020/0329404 A1* | 10/2020 | Vikberg | H04L 65/1016 |

OTHER PUBLICATIONS

Ericsson, "EPS Fallback for voice further enhancements", S2-182380, Telefonaktiebolaget L M Ericsson, 3GPP TSG-SA WG2 Meeting #126, Feb. 26-Mar. 2, 2018, p. 1-10.

PCT/CN2018/082091, "International Search Report and the Written Opinion of the International Search Authority" ISA/CN, State Intellectual Property Office of the P.R. China, dated Dec. 11, 2018, pp. 1-6.

3rd Generation Partnership Project, "Technical Specification Group Services and System Aspects; Single Radio Voice Call Continuity (SRVCC); Stage 2; (Release 15)", 3GPP TS 23.216, V15.1.0, Dec. 22, 2017, pp. 1-69.

* cited by examiner

VOICE SESSION HANDOVER BETWEEN MOBILE NETWORKS WITH DIFFERENT NETWORK TECHNOLOGIES

FIELD

The subject matter disclosed herein relates generally to wireless communications and more particularly relates to a voice session handover.

BACKGROUND

The following abbreviations are herewith defined, at least some of which are referred to within the following description: Third Generation Partnership Project ("3GPP"), Authentication Authorization and Accounting ("AAA"). Positive-Acknowledgment ("ACK"), Access and Mobility Management Function ("AMF"), Access Network ("AN"), Application Function ("AF"), Ancillary Terrestrial Component ("ATC"), Application Programming Interface ("API"), Access Point ("AP"), Access Point Name ("APN"), Aggregate MBR ("AMBR"), Application Server ("AS"), Authentication Center ("AuC"), Authentication Server Function ("AUSF"), Base Station ("BS"), Connection Management ("CM"), Core Network ("CN"), Correlation MSISDN ("C MSISDN"). Control Plane ("CP"), Circuit Switched ("CS"), Discontinuous Reception ("DRX"), Downlink ("DL"), Data Network Name ("DNN"). Domain Name System ("DNS"), Enhanced Discontinuous Reception ("eDRX"), Enhanced Mobile Broadband ("eMBB"), Evolved Node B ("eNB"), Enhanced Subscriber Identification Module ("eSIM"), Enhanced ("E"), Enhanced Data Rates for GSM Evolution ("EDGE"), Equipment Identity Register ("EIR"), Evolved Packet System ("EPS"), European Telecommunications Standards Institute ("ETSI"), Frequency Division Duplex ("FDD"), Frequency Division Multiple Access ("FDMA"), Fully Qualified Domain Name ("FQDN"). Guaranteed Bit Rate ("GBR"), GPRS EDGE Radio Access Network ("GERAN"), Gateway Mobile Location Center ("GMLC"), General Packet Radio Service ("GPRS"), Global System For Mobile Communications ("GSM"), Global System For Mobile Communications Association ("GSMA"), Generic Public Subscription Identifier ("GPSI"), Hybrid Automatic Repeat Request ("HARQ"), Home Location Register ("HLR"), Handover ("HO"), Home Policy Control Function ("H-PCF"), Home Public Land Mobile Network ("HPLMN"), Home Subscriber Server ("HSS"), IMS Centralized Services ("ICS"), Identity or Identifier or Identification ("ID"), Information Element ("IE"), International Mobile Equipment Identity ("IMEI"), IP Multimedia Subsystem ("IMS"), International Mobile Subscriber Identity ("IMSI"), Internet-of-Things ("IoT"), Internet Protocol ("IP"), Location Area Identity ("LAI"), Long Term Evolution ("LTE"), Multiple Access ("MA"), Maximum Bit Rate ("MBR"), Modulation Coding Scheme ("MCS"), Mobile Country Code ("MCC"), Mobile Equipment ("ME"), Mobility Management ("MM"). Mobility Management Entity ("MME"), Mobile Network Code ("MNC"), Mobile Network Operator ("MNO"). Mobile Station ("MS"), Mobile Switching Center ("MSC"), Mobile Subscriber Integrated Services Digital Network Number ("MSISDN"). Machine Type Communication ("MTC"), Master Information Block ("MIB"), Mobility Management ("MM"), Non-Access Stratum ("NAS"). Narrowband ("NB"), Network Parameter Configuration ("NC"), Neighbor Cell List ("NCL"), Negative-Acknowledgment ("NACK") or ("NAK"), Network Exposure Function ("NEF"), Network Resource Identifier ("NRI"). Next Generation ("NG"), Next Generation Node B ("gNB"). New Radio ("NR"). Orthogonal Frequency Division Multiplexing ("OFDM"), Over-the-Air ("OTA"), Policy Control Function ("PCF"), Packet Data Network ("PDN"), PDN Gateway Control Plane ("PGW-C"), Protocol Data Unit ("PDU"), Public Land Mobile Network ("PLMN"), Packet Switched ("PS"), Power Saving Mode ("PSM"), Pointer ("PTR"). Quality of Service ("QoS"). Radio Resource Control ("RRC"), Radio Access Network ("RAN"), Radio Access Technology ("RAT"). Receive ("RX"). Service Based Interface ("SBI"), Single Carrier Frequency Division Multiple Access ("SC-FDMA"), Service Capability Exposure Function ("SCEF"), Service Capability Servers ("SCS"), Session Initiation Protocol ("SIP"), Service Level Agreement ("SLA"), Subscriber Management ("SM"), Subscriber Management Function ("SMF"), Single Network Slice Selection Assistance Information ("S-NSSAI"), Subscriber Identity Module ("SIM"), System Information Block ("SIB"), Short Message Service ("SMS"), Signaling Radio Bearers ("SRBs"), Session Transfer Identifier ("STI"), Session Transfer Number ("STN"), Session Transfer Number-Single Radio ("STI-SR"), Subscription Concealed Identifier ("SUCI"), Subscription Permanent Identifier ("SUPI"), Single Radio Voice Call Continuity ("SRVCC"), Tracking Area ("TA"). Temporary Mobile Subscriber Identity ("TMSI"). Transmit ("TX"), Unified Data Management ("UDM"), User Data Repository ("UDR"), User Entity/Equipment (Mobile Terminal) ("UE"), Universal Integrated Circuit Card ("UICC"), Uplink ("UL"), Universal Mobile Telecommunications System ("UMTS"), User Plane ("UP"), User Plane Function ("UPF"), Universal Subscriber Identity Module ("USIM"), Universal Terrestrial Radio Access Network ("UTRAN"), Visitor Location Register ("VLR"). Voice Over IP ("VoIP"), Visited Policy Control Function ("V-PCF"), Visited Public Land Mobile Network ("VPLMN"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, a voice session may be handed over to a different network. In such networks, the different network may be another (e.g., different) mobile network technology or an older generation network than the network handing over the voice session.

BRIEF SUMMARY

Methods for voice session handover are disclosed. Apparatuses and systems also perform the functions of the apparatus. In one embodiment, the method includes receiving a handover message including first information indicating a voice handover request to handover a voice session from a first network to a second network. In various embodiments, the method includes determining a first network function configured to facilitate communication with the second network. In certain embodiments, the method includes transmitting a relocation request message to the first network function, wherein the relocation request message includes second information related to the voice handover request. In some embodiments, the method includes receiving a relocation response message from the first network function, wherein the relocation response message indicates completion of a voice handover. In various embodiments, the method includes transmitting third information related to the voice handover to a third network function, wherein the third network function suspends non-guaranteed bit rate data flows.

In one embodiment, the third network function includes a session management function. In a further embodiment, the first network includes another (e.g., different) mobile network technology or a newer generation network than the second network. In certain embodiments, the first network function includes a single radio voice call continuity interworking function. In various embodiments, the method includes transmitting fourth information related to the voice handover to a radio access network. In some embodiments, the method includes transmitting fifth information related to the voice handover to a remote unit.

An apparatus for voice session handover, in one embodiment, includes a receiver that receives a handover message including first information indicating a voice handover request to handover a voice session from a first network to a second network. In various embodiments, the apparatus includes a processor that determines a first network function configured to facilitate communication with the second network. In some embodiments, the apparatus includes a transmitter that transmits a relocation request message to the first network function, wherein the relocation request message includes second information related to the voice handover request. In certain embodiments, the receiver receives a relocation response message from the first network function, wherein the relocation response message indicates completion of a voice handover, and the transmitter transmits third information related to the voice handover to a third network function, wherein the third network function suspends non-guaranteed bit rate data flows.

In one embodiment, a method for voice session handover includes receiving a handover message including first information indicating a voice handover request to handover a voice session from a first network to a second network. In various embodiments, the method includes determining data flows related to the voice session, a guaranteed bit rate, a non-guaranteed bit rate, or some combination thereof based on the first information. In certain embodiments, the method includes storing second information related to non-guaranteed bit rate data flows. In some embodiments, the method includes transmitting third information indicating release of voice session data flows and guaranteed bit rate data flows to a fourth network function.

In one embodiment, the method includes deleting context information related to the voice session data flows and the guaranteed bit rate data flows. In a further embodiment, the first network includes another (e.g., different) mobile network technology or a newer generation network than the second network. In certain embodiments, the fourth network function includes a user plane function.

An apparatus for voice session handover, in one embodiment, includes a receiver that receives a handover message including first information indicating a voice handover request to handover a voice session from a first network to a second network. In various embodiments, the apparatus includes a processor that: determines data flows related to the voice session, a guaranteed bit rate, a non-guaranteed bit rate, or some combination thereof based on the first information; and stores second information related to non-guaranteed bit rate data flows. In some embodiments, the apparatus includes a transmitter that transmits third information indicating release of voice session data flows and guaranteed bit rate data flows to a fourth network function.

In another embodiment, a method for voice session handover includes receiving a handover message including first information indicating a voice handover request to handover a voice session from a first network to a second network. In various embodiments, the method includes determining data flows related to the voice session, a guaranteed bit rate, a non-guaranteed bit rate, or some combination thereof based on the first information. In certain embodiments, the method includes storing second information related to non-guaranteed bit rate data flows. In some embodiments, the method includes deleting context information related to voice session data flows and guaranteed bit rate data flows.

In one embodiment, the first network includes another (e.g., different) mobile network technology or a newer generation network than the second network. In a further embodiment, receiving the handover message includes receiving the handover message at a remote unit.

An apparatus for voice session handover, in one embodiment, includes a receiver that receives a handover message including first information indicating a voice handover request to handover a voice session from a first network to a second network. In various embodiments, the apparatus includes a processor that: determines data flows related to the voice session, a guaranteed bit rate, a non-guaranteed bit rate, or some combination thereof based on the first information; stores second information related to non-guaranteed bit rate data flows; and deletes context information related to voice session data flows and guaranteed bit rate data flows.

In some embodiments, a method for voice session handover includes receiving, at a first network function, a handover message including first information indicating a voice handover request to handover a voice session from a first network to a second network. In various embodiments, the method includes mapping security context information to second information used by the second network. In certain embodiments, the method includes selecting a second network function configured to facilitate voice handover in the second network based on the first information.

In one embodiment, the first network includes another (e.g., different) mobile network technology or a newer generation network than the second network. In a further embodiment, the first network function includes a single radio voice call continuity interworking function. In certain embodiments, the single radio voice call continuity interworking function includes a mobile management entity that communicates with a core network of the second network without connection to an evolved packet core. In some embodiments, the single radio voice call continuity interworking function includes a mobile management entity that communicates with a core network of the second network without bearer splitting functionality. In certain embodiments, the second network function includes a mobile switching center.

An apparatus for voice session handover, in one embodiment, includes a receiver that receives, at a first network function, a handover message including first information indicating a voice handover request to handover a voice session from a first network to a second network. In various embodiments, the apparatus includes a processor that: maps security context information to second information used by the second network; and selects a second network function configured to facilitate voice handover in the second network based on the first information.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
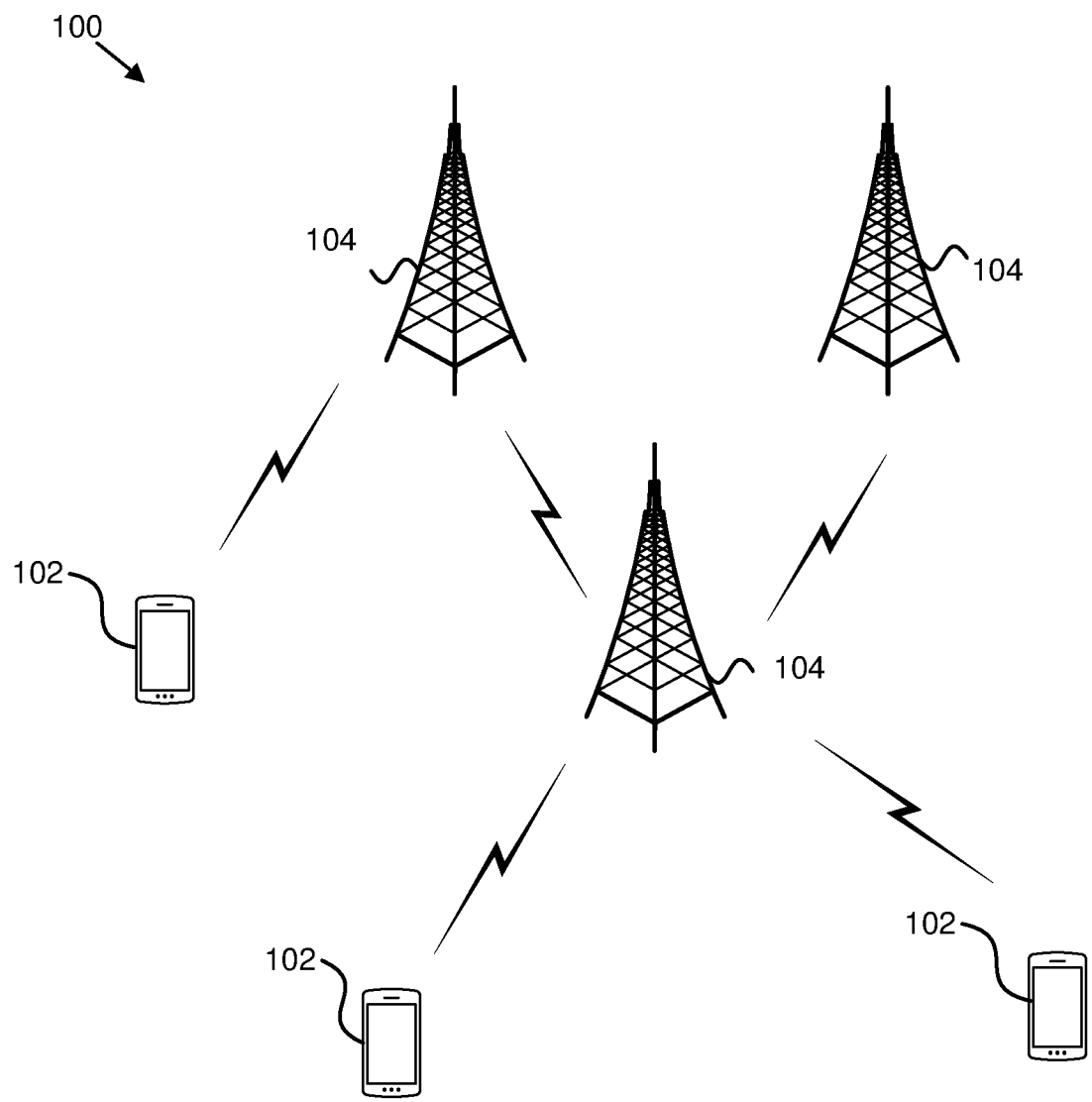
FIG. 1 is a schematic block diagram illustrating one embodiment of a wireless communication system for voice session handover.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java. Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for voice session handover. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems). IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations. UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a network device, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art. In some embodiments, a network unit 104 may include one or more of the following network components a gNB, a RAN, an MME, an HSS, an SCEF, an SCS, an AS, an AMF, an SMF, an NEF, a DB, a PCF, a DR, a UPF, and/or a UDM.

In one implementation, the wireless communication system 100 is compliant with the 5G or NG (Next Generation) of the 3GPP protocol, wherein the network unit 104 transmits using NG RAN technology. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 may receive a handover message including first information indicating a voice handover request to handover a voice session from a first network to a second network. In various embodiments, the network unit 104 may determine a first network function configured to facilitate communication with the second network. In certain embodiments, the network unit 104 may transmit a relocation request message to the first network function, wherein the relocation request message includes second information related to the voice handover request. In some embodiments, the network unit 104 may receive a relocation response message from the first network function, wherein the relocation response message indicates completion of a voice handover. In various embodiments, the network unit 104 may transmit third information related to the voice handover to a third network function, wherein the third network function suspends non-guaranteed bit rate data flows. Accordingly, a network unit 104 may be used for voice session handover.

In certain embodiments, a network unit 104 may receive a handover message including first information indicating a voice handover request to handover a voice session from a first network to a second network. In various embodiments, the network unit 104 may determine data flows related to the voice session, a guaranteed bit rate, a non-guaranteed bit rate, or some combination thereof based on the first information. In certain embodiments, the network unit 104 may store second information related to non-guaranteed bit rate data flows. In some embodiments, the network unit 104 may transmit third information indicating release of voice session data flows and guaranteed bit rate data flows to a fourth network function. Accordingly, a network unit 104 may be used for voice session handover.

In certain embodiments, a remote unit 102 may receive a handover message including first information indicating a voice handover request to handover a voice session from a first network to a second network. In various embodiments, the remote unit 102 may determine data flows related to the voice session, a guaranteed bit rate, a non-guaranteed bit rate, or some combination thereof based on the first information. In certain embodiments, the remote unit 102 may store second information related to non-guaranteed bit rate data flows. In some embodiments, the remote unit 102 may delete context information related to voice session data flows and guaranteed bit rate data flows. Accordingly, a remote unit 102 may be used for voice session handover.

In certain embodiments, a network unit 104 may receive, at a first network function, a handover message including first information indicating a voice handover request to handover a voice session from a first network to a second network. In various embodiments, the network unit 104 may map security context information to second information used by the second network. In certain embodiments, the network unit 104 may select a second network function configured to facilitate voice handover in the second network based on the first information. Accordingly, a network unit 104 may be used for voice session handover.

Figure 2:
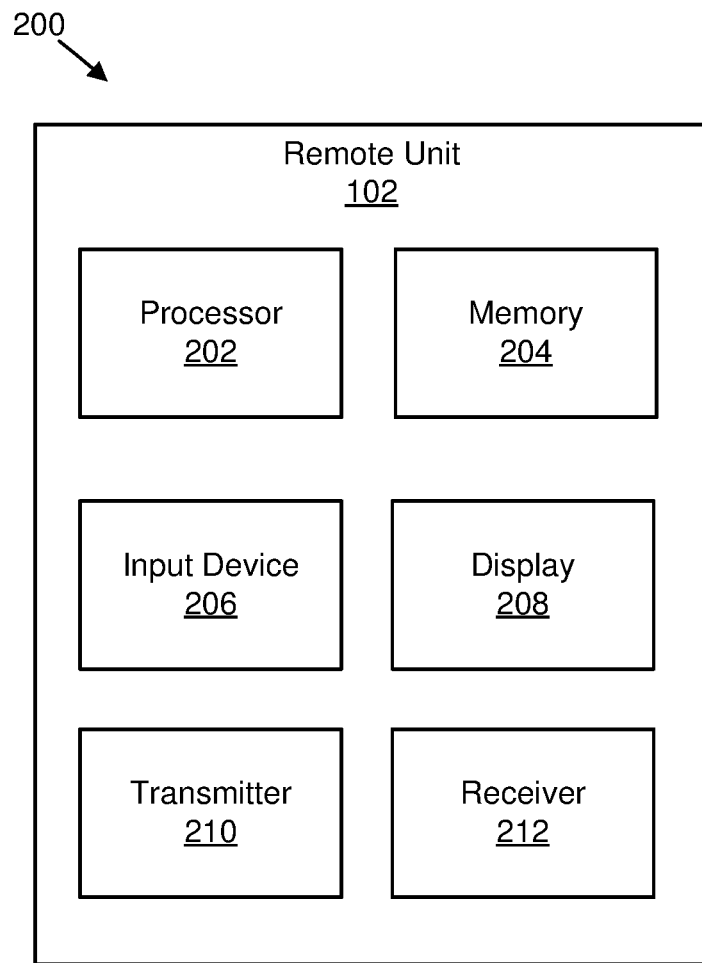
FIG. 2 is a schematic block diagram illustrating one embodiment of an apparatus that may be used for voice sessions.

FIG. 2 depicts one embodiment of an apparatus 200 that may be used for voice sessions. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In certain embodiments, the processor 202 may be used to: determine data flows related to the voice session, a guaranteed bit rate, a non-guaranteed bit rate, or some combination thereof based on the first information; store (on the memory 204) second information related to non-guaranteed bit rate data flows; and delete context information related to voice session data flows and guaranteed bit rate data flows. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to network registration. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device.

The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. In one embodiment, the receiver 212 may receive a handover message including first information indicating a voice handover request to handover a voice session from a first network to a second network. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
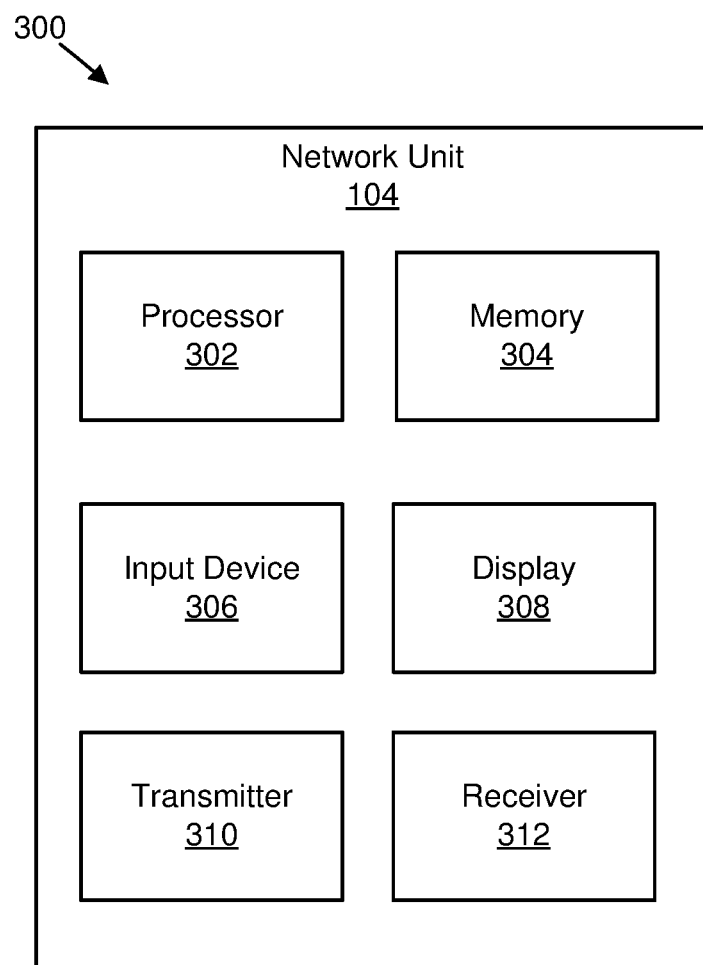
FIG. 3 is a schematic block diagram illustrating one embodiment of an apparatus that may be used for voice session handover.

FIG. 3 depicts one embodiment of an apparatus 300 that may be used for voice session handover. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the receiver 312 receives a handover message including first information indicating a voice handover request to handover a voice session from a first network to a second network. In various embodiments, the processor 302 determines a first network function configured to facilitate communication with the second network. In some embodiments, the transmitter 310 transmits a relocation request message to the first network function, wherein the relocation request message includes second information related to the voice handover request. In certain embodiments, the receiver 312 receives a relocation response message from the first network function, wherein the relocation response message indicates completion of a voice handover, and the transmitter 310 transmits third information related to the voice handover to a third network function, wherein the third network function suspends non-guaranteed bit rate data flows.

In some embodiments, the receiver 312 receives a handover message including first information indicating a voice handover request to handover a voice session from a first network to a second network. In various embodiments, the processor 302: determines data flows related to the voice session, a guaranteed bit rate, a non-guaranteed bit rate, or some combination thereof based on the first information; and stores second information related to non-guaranteed bit rate data flows. In some embodiments, the transmitter 310 transmits third information indicating release of voice session data flows and guaranteed bit rate data flows to a fourth network function.

In certain embodiments, the receiver 312 receives, at a first network function, a handover message including first information indicating a voice handover request to handover a voice session from a first network to a second network. In various embodiments, the processor 302: maps security context information to second information used by the second network; and selects a second network function configured to facilitate voice handover in the second network based on the first information. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
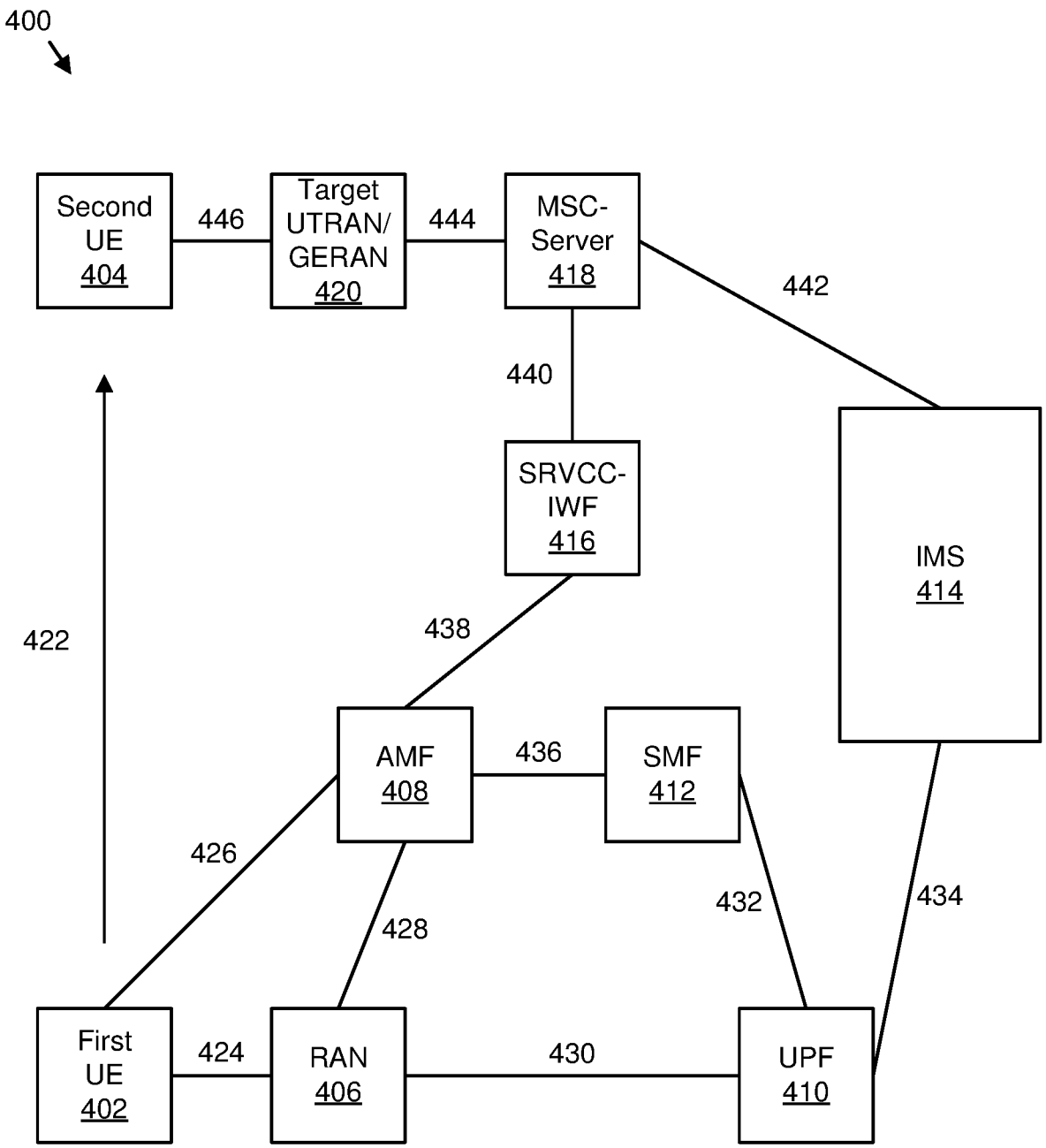
FIG. 4 is a schematic block diagram illustrating another embodiment of a wireless communication system for voice session handover.

FIG. 4 is a schematic block diagram illustrating another embodiment of a wireless communication system 400 for voice session handover. The system 40 includes a first UE 402, a second UE 404, a RAN 406, an AMF 408, a UPF 410, an SMF 412, an IMS 414, a SRVCC-IWF 416, an MSC-server 418, and a target UTRAN/GERAN 420.

In some embodiments, the first UE 402 may communicate with the second UE 404 over a first connection 422. In various embodiments, the first UE 402 may communicate with the RAN 406 over a second connection 424 (e.g., NR). In certain embodiments, the first UE 402 may communicate with the AMF 408 over a third connection 426 (e.g., N1). In one embodiment, the RAN 406 may communicate with the AMF 408 over a fourth connection 428 (e.g., N2). In some embodiments, the RAN 406 may communicate with the UPF 410 over a fifth connection 430 (e.g., N3). In various embodiments, the UPF 410 may communicate with the SMF 412 over a sixth connection 432 (e.g., N4). In certain embodiments, the UPF 410 may communicate with the IMS 414 over a seventh connection 434 (e.g., N6). In one embodiment, the SMF 412 may communicate with the AMF 408 over an eighth connection 436 (e.g., N11).

In some embodiments, the AMF 408 may communicate with the SRVCC-IWF 416 over a ninth connection 438 (e.g., Nsr). In various embodiments, the SRVCC-IWF 416 may communicate with the MSC-server 418 over a tenth connection 440 (e.g., Sv). In certain embodiments, the IMS 414 may communicate with the MSC-server 418 over an eleventh connection 442. In one embodiment, the MSC-server 418 may communicate with the target UTRAN/GERAN 420 over a twelfth connection 444 (e.g., Iu-cs/A). In some embodiments, the target UTRAN/GERAN 420 may communicate with the second UE 404 over a thirteenth connection 446 (e.g., Um/Uu).

In some embodiments, certain components in the system 400 may behave as described in 3GPP TS 23.401 or 3GPP TS 23.501. As illustrated in FIG. 4, the SRVCC-IWF 416 may be used for interworking between a 5G network and a 3G network or a 2G network. In certain embodiments, the SRVCC-IWF 416 may be a modified version of an MME supporting SRVCC with the following differences: the SRVCC-IWF 416 may not be like an MME serving a UE all the time and may not have subscriber data; the SRVCC-IWF 416 may not be aware of a location of the UE; the SRVCC-IWF 416 may appear like an MME to the MSC-server 418; the SRVCC-IWT 416 may not perform bearer splitting for a non-IMS bearer; the SRVCC-IWF 416 may not perform combined attach (e.g., location update to the MSC-server 418; the SRVCC-IWF 416 may appear to be like a modified MME to the AMF 408 for SRVCC to 3G and/or 2G support and interworking; the SRVCC-IWF 416 may be collocated with the AMF 408 or with the MSC-server 418; and an Nsr reference point may look like an N26 reference point between the AMF 408 and an MME.

Figure 5:
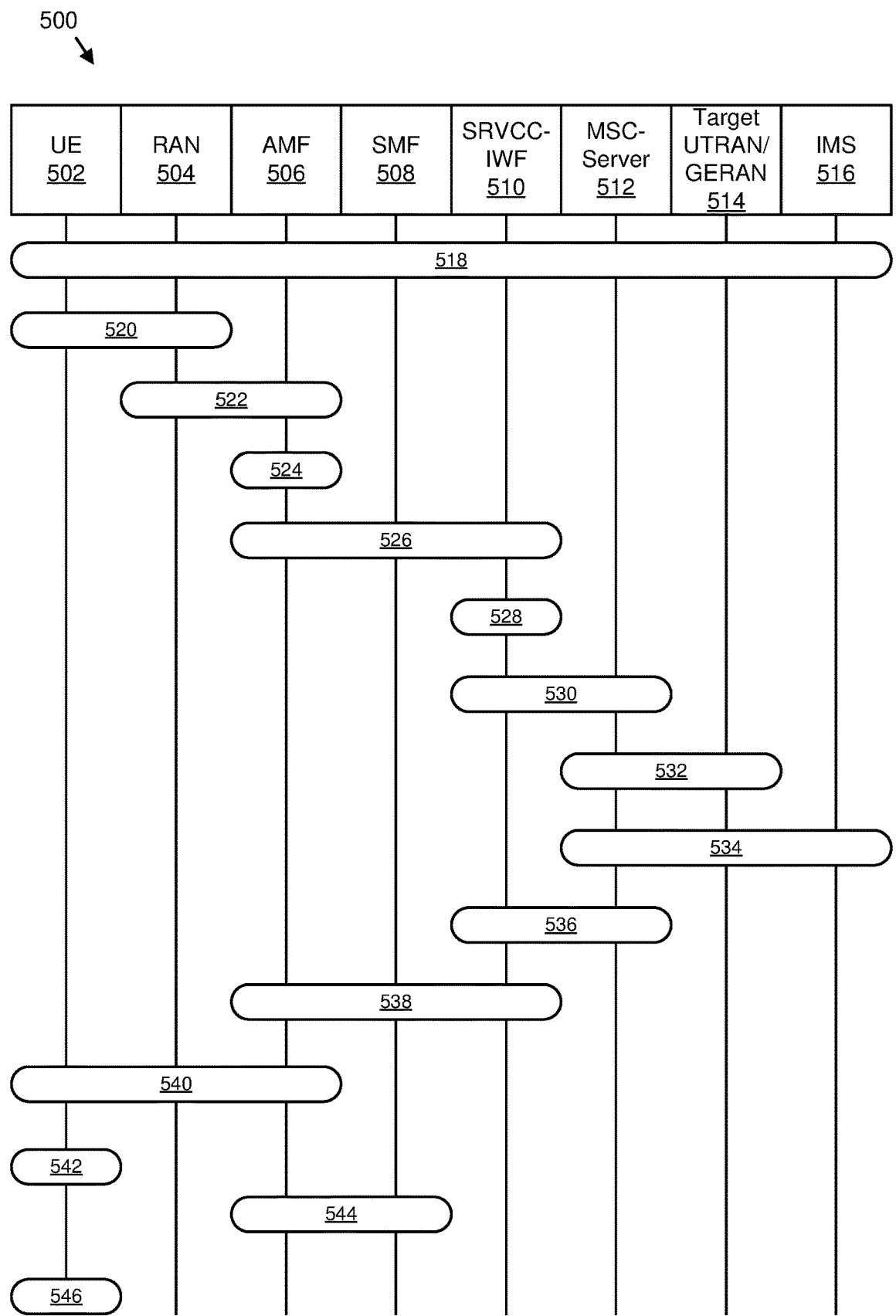
FIG. 5 illustrates one embodiment of communications for voice session handover.

FIG. 5 illustrates one embodiment of communications 500 for voice session handover. Specifically, communications 5X) between a UE 502, a RAN 504, an AMF 506, an SMF 508, a SRVCC-IWF 510, an MSC-server 512, a target UTRAN/GERAN 514, and an IMS 516 are illustrated. As may be appreciated, any of the communications 500 described herein may be considered messages and/or parts of messages.

Specifically, FIG. 5 illustrates some high-level aspects of SRVCC handover to a 2G/3G network. In some embodiments, the UE 502 has an ongoing IMS voice session 518 in 5G. In various embodiments, only voice QoS flow may be handed over to a target 2G/3G network, data flows may be suspended or released in the SMF 508 and the UE 502 after the handover is completed. Moreover, the UE 502 may resume the suspended data flows at a time in which the UE 502 returns back to the 5G network after the voice call is terminated in the 2G/3G network. As illustrated, the UE 502 may transmit 520 measurement reports to the RAN 504.

In some embodiments, the RAN 504 may detect based on the measurement reports from the UE 502 that a handover to 3G/2G is be performed. Accordingly, the RAN 504 may send 522 a handover required message to the AMF 506 indicating that the handover is a 5G SRVCC handover to a 3G/2G network. In certain embodiments, the AMF 506 may select 524 an appropriate SRVCC-IWF (e.g., the SRVCC-IWF 510) and send 526 a SRVCC request for the voice component only, without including any EPS bearer context information. In various embodiments, based on a cell id, the SRVCC-IWF 510 may select 528 an MSC-server (e.g., the MSC-server 512) serving this area and may send 530 a SRVCC request for the voice component to the MSC-server 512. In some embodiments, the MSC-server 512 may prepare 532 for handover to the target GERAN/UTRAN 514 and may initiate 534 a remote leg transmission to the IMS 516 for the UE 502 and the IMS 516 may release an old remote leg corresponding to the UE 502.

In certain embodiments, the MSC-server 512 may acknowledge 536 the handover to the SRVCC-IWF 510 and the SRVCC-IWF 510 may acknowledge 538 the handover to the AMF 506. In various embodiments, the AMF 506 may send 540 the handover command to the UE 502, and the UE 502 may release 542 the session for the IMS 516 voice media and for GBR QoS flows. Moreover, the AMF 506 may release 544 the session for the IMS 516 voice media and for GBR QoS flows. As may be appreciated, other non-GBR and non-voice sessions may be suspended and may be resumed after the UE 502 returns to a 5G network. In some embodiments, the UE 502 may perform release of non-GBR and non-voice sessions after or in parallel with a handover completion message. In certain embodiments, the UE 502 may tune 546 to a 2G/3G network and may send a handover complete message to the target GERAN/UTRAN 514.

In certain embodiment, for emergency sessions if an emergency service session after handover is complete, the AMF 506 or the MSC-server 512 may send a subscriber location report carrying the identity of the MSC-server 512 to a GMLC associated with the source or target side, respectively, as defined in 3GPP TS 23.271, to support location continuity.

Figure 6:
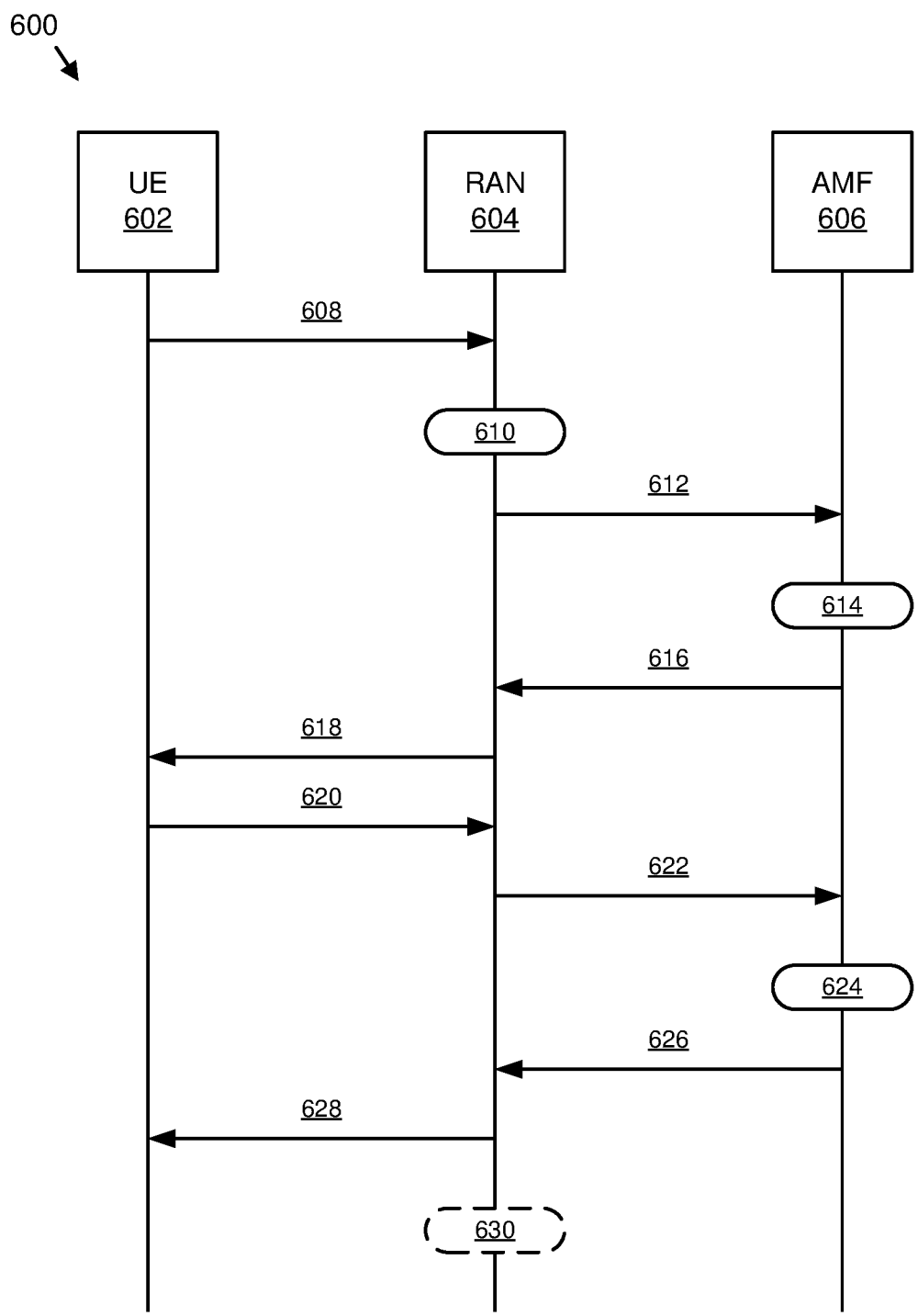
FIG. 6 illustrates another embodiment of communications for voice session handover.

FIG. 6 illustrates another embodiment of communications 60 for voice session handover. Specifically, communications 600 between a UE 602, a RAN 604, and an AMF 606 are illustrated. As may be appreciated, any of the communications 600 described herein may be considered messages and/or parts of messages.

In some embodiments, a first communication 608 from the UE 602 to the RAN 604 may include the UE 602 sending 608 a registration request to the RAN 604. In certain embodiments, the registration request may include the UE's 602 5G SRVCC capability. In various embodiments, the RAN 604 may perform 610 AMF selection. In certain embodiments AMF selection may be performed as specified in TS 23.501.

In one embodiment, a second communication 612 from the RAN 604 to the AMF 606 may include the RAN 604 forwarding the registration request with 5G SRVCC capability information to the AMF 606. In some embodiments, the AMF 606 may perform 614 a registration procedure, such as a registration procedure as specified in TS 23.502, clause 4.2.2.2.2.

In certain embodiments, a third communication 616 from the AMF 606 to the RAN 604 may include the AMF 606 performing a UE radio capability match procedure and indicating whether the AMF 606 is to receive a voice support match indicator as a result of the UE 602 providing its 5G SRVCC capability and if the network supports 5G SRVCC transition to a 3G/2G network.

In some embodiments, a fourth communication 618 from the RAN 604 to the UE 602 may include, upon receiving a UE radio capability match request from the AMF 606, the RAN 604 sending an RRC UE capability enquiry requesting that the UE 602 upload its UE radio capability information. In various embodiments, a fifth communication 620 from the UE 602 to the RAN 604 may include the UE 602 providing the RAN 604 with its UE radio capabilities and sending RRC UE capability information.

In certain embodiments, the RAN 604 determines whether the UE radio capabilities are compatible with a network configuration for ensuring voice service continuity of voice calls initiated in IMS. In some embodiments, a sixth communication 622 from the RAN 604 to the AMF 606 may include the RAN 604 providing a UE radio capability match response to the AMF 606. In various embodiments, to determine an appropriate UE radio capability match response, the RAN 604 may be configured by an operator to determine whether the UE 602 supports certain capabilities used for voice continuity of voice calls using IMS PS. In certain embodiments, in a shared network, the RAN 604 may keep a separate configuration for each PLMN. As may be appreciated, the RAN 604 may perform various checks to determine whether the UE 602 supports certain capabilities. For example, the RAN 604 may check: SRVCC, 5G SRVCC and 5G UTRAN/E-UTRAN voice over PS capabilities; radio capabilities for 5G, UTRAN/E-UTRAN FDD, and/or TDD; and/or support of 5G UTRAN/E-UTRAN frequency bands. In some embodiments, a network configuration considered in a decision for a voice support match indicator may be homogeneous within a certain area (e.g., an AMF serving area) to facilitate the voice support match indicator from the RAN 604 being valid within such area. In certain embodiments, the UE radio capability match response includes a voice support match indicator provided to the AMF 606 to indicate whether the UE 602 capabilities and networks configuration are compatible for ensuring voice service continuity of voice calls initiated in IMS.

In various embodiments, the AMF 606 stores 624 a received voice support match indicator in an MM context and uses it as an input for setting an IMS voice over PS session supported indication. In some embodiments, a setting of an IMS voice over PS session supported indication and of a homogeneous support for IMS voice over PS session supported indication may be as described in TS 23.501.

In certain embodiments, a seventh communication 626 from the AMF 606 to the RAN 604 may include the AMF 606 sending a registration accept with an IMS voice over PS session supported indication and may include a SRVCC operation possible indication (this may also be included in an NG AP initial context setup request). In such embodiments, the registration accept message may mean that both the UE 602 and the AMF 606 are 5G SRVCC-capable and that STN-SR and C-MSISDN are included in subscription data.

In various embodiments, an eighth communication 628 from the RAN 604 to the UE 602 may include the RAN 604 forwarding the registration accept with the IMS voice over PS session supported indication to the UE 602.

In some embodiments, in response to the UE 602 being in a connected state (e.g., CM-CONNECTED state), then the RAN 604 may configure 630 a neighbor cell list for the UE 602 to include VoIP-incapable cells (e.g., 2G/3G).

Figure 7:
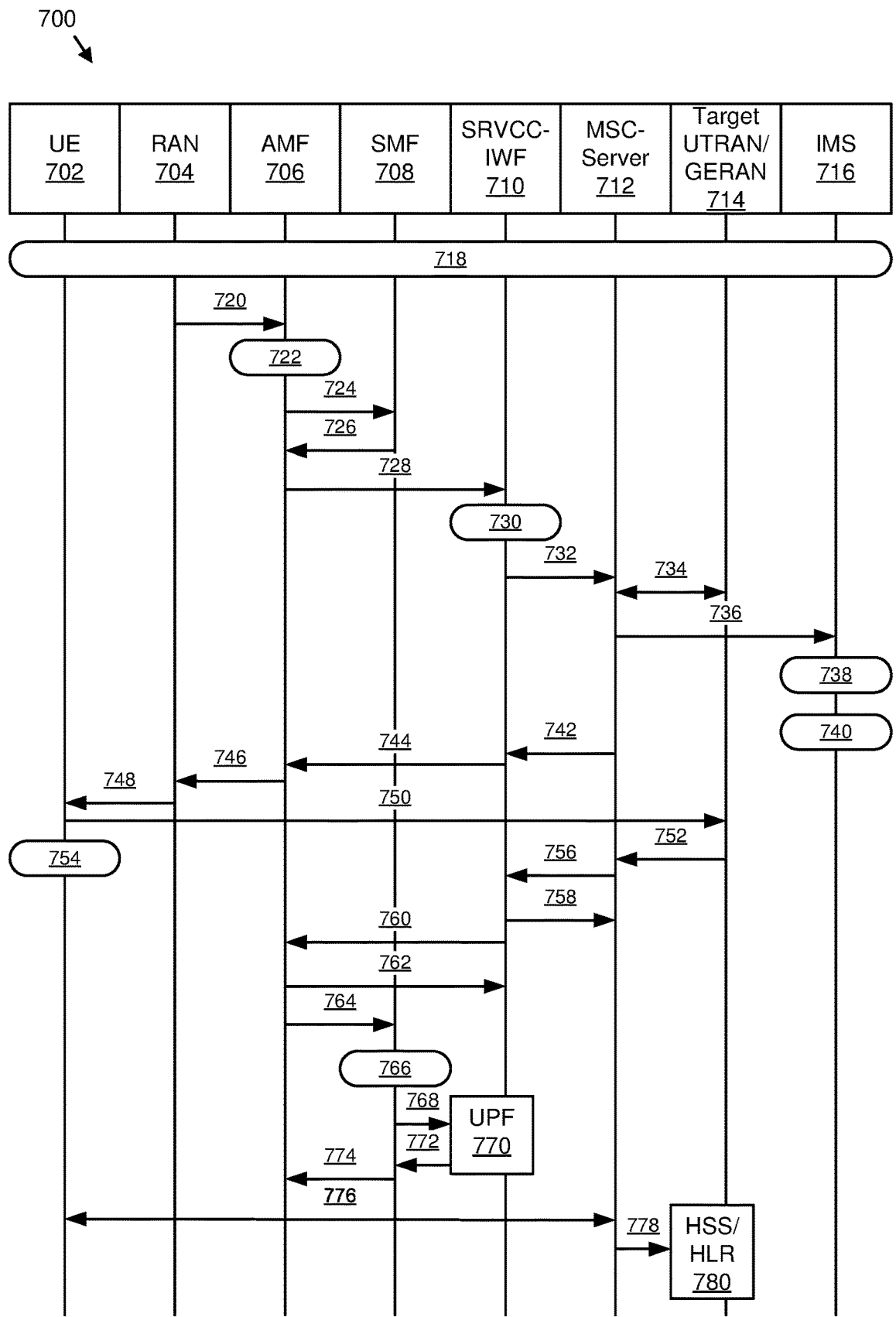
FIG. 7 illustrates a further embodiment of communications for voice session handover.

In certain embodiments, as a result of the SRVCC capability being matched by the AMF 606 and provided to the RAN 604 as described in FIG. 6, a procedure for SRVCC handover from 5G to 3G/2G as described in FIG. 7 may be performed.

FIG. 7 illustrates a further embodiment of communications 700 for voice session handover. Specifically, communications 700 between a UE 702, a RAN 704, an AMF 706, an SMF 708, a SRVCC-IWF 710, an MSC-server 712, a target UTRAN/GERAN 714, and an IMS 716 are illustrated. As may be appreciated, any of the communications 700 described herein may be considered messages and/or parts of messages.

In certain embodiments, the UE 702 is IMS 716 registered and has 718 an IMS voice session ongoing. In such embodiments, a capability exchange was performed prior to the IMS voice session so that the UE 702, the RAN 704, and the network are aware of 5G SRVCC capabilities. In some embodiments, the UE 702 may send measurement reports to the RAN 704.

In various embodiments, based on UE measurement reports the RAN 704 may determine to trigger a 5G SRVCC handover to the target GERAN/UTRAN 714. In some embodiments, a first communication 720 from the RAN 704 to the AMF 706 may include the RAN 704 sending a handover required (e.g., including: a target ID, a source to target transparent container, a 5G SRVCC handover indication, and so forth) message to the AMF 706. In certain embodiments, the 5G SRVCC handover indication indicates to the AMF 706 that a target is only CS capable, hence this is a 5G SRVCC handover operation only transmitted to the CS domain. In various embodiments, the first communication 720 includes an indication that the UE 702 is not available for the PS service in the target cell.

In some embodiments, the AMF 706 determines 722 from a target identifier IE that a type of handover is a handover to a GERAN/UTRAN. Moreover, in certain embodiments, the AMF 706 selects a SRVCC-IWF.

In various embodiments, a second communication 724 from the AMF 706 to the SMF 708 may include the AMF 706 using Nsmf_PDUSession_ContextRequest to request a PGW-C+SMF for each PDU session associated with 3GPP access to provide SM context that also includes mapped EPS bearer contexts. In some embodiments, a third communication 726 from the SMF 708 to the AMF 706 may include the SMF 708 using Nsmf_PDUSession_ContextResponse to respond to the request from the AMF 706.

In certain embodiments, a fourth communication 728 from the AMF 706 to the SRVCC-IWF 710 may include the AMF 706 sending a forward relocation request message (e.g., including: a target ID, a source to target transparent container, mapped MM context (including an EPS security context mapped from a 5G security context), a UE usage type, an IMSI, an STN-SR, a C MSISDN, and/or other information). This fourth communication may not include any EPS bearer context information but may include an indication that the relocation is for SRVCC.

In various embodiments, the SRVCC-IWF 710 may perform 730 an MSC-server selection based on a target ID and may map an EPS security context to a UMTS or GPRS security context.

In some embodiments, a fifth communication 732 from the SRVCC-IWF 710 to the MSC-server 712 may include the SRVCC-IWF 712 sending an SRVCC PS to CS request message (e.g., including: an IMSI, a target ID, an STN-SR, a C MSISDN, a generic source to target transparent container, an MM context, an emergency indication, and/or other information) to the MSC-server 712. In certain embodiments, an emergency indication and an equipment identifier may be included in response to an ongoing session being an emergency session. In various embodiments, authenticated IMSI and C MSISDN may be included if available. In some embodiments, an MM context contains security related information. In certain embodiments a CS security key may be derived by the SRVCC-IWF 712 from an E UTRAN/EPS domain key as defined in TS 33.401. In various embodiments, a CS Security key may be sent in an MM context.

In some embodiments, a sixth communication 734 between the MSC-server 712 and the target UTRAN/GERAN 714 may include the MSC-server 712 performing resource allocation with the target UTRAN/GERAN 714 by exchanging a handover request message and/or a handover acknowledge message. In certain embodiments, in response to an MSC-server indicated priority, a target BS may allocate radio resources based on procedures with priority indication.

In various embodiments, a seventh communication 736 from the MSC-server 712 to the IMS 716 may include for a non-emergency session, the MSC-server 712 initiating a session transfer by transmitting a STN-SR message to the IMS 716 (e.g., by sending an ISUP IAM). In some embodiments, in response to the MSC-server 712 supporting IMS centralized services, the MSC-server 712 may send a SIP invite to the IMS 716 instead. In certain embodiments, for an emergency session, the seventh communication 736 may include the MSC-server 712 initiating a session transfer by using a locally configured E-STN-SR and by including an equipment identifier. In various embodiments, an IMS service continuity or emergency IMS service continuity procedures may be applied for execution of a session transfer, for example as described in TS 23.237.

In some embodiments, during execution of a session transfer procedure the IMS 716 may update 738 a remote end with an SDP of a CS access leg. In such embodiments, a downlink flow of VoIP packets may be switched to the CS access leg at this point. In certain embodiments, the IMS 716 may release 740 a source IMS access leg, for example as described in TS 23.237.

In various embodiments, an eighth communication 742 from the MSC-server 712 to the SRVCC-IWF 710 may include the MSC-server 712 sending an SRVCC PS to CS response message (e.g., including a target to source transparent container) to the SRVCC-IWF 710.

In certain embodiments, a ninth communication 744 from the SRVCC-IWF 710 to the AMF 706 may include the SRVCC-IWF 710 sending a relocation response to the AMF 706.

In some embodiments, a tenth communication 746 from the AMF 706 to the RAN 704 may include the AMF 706 sending a handover command message (e.g., including a target to source transparent container, including a 5G SRVCC indication) to the RAN 704. In certain embodiments, the tenth communication 746 may only include information about a voice component.

In various embodiments, an eleventh communication 748 from the RAN 704 to the UE 702 may include the RAN 704 sending a handover command message (e.g., including a target to source transparent container, including a 5G SRVCC indication) to the UE 702.

In certain embodiments, a twelfth communication 750 from the UE 702 to the target UTRAN/GERAN 714 may include the UE 702 tuning to the target UTRAN/GERAN 714. In some embodiments, handover detection at the target UTRAN/GERAN 714 occurs, and the target UTRAN/GERAN 714 may, in a thirteenth communication 752, send a handover detection message to the MSC-server 712. At this point in time, the MSC-server 712 may send and/or receive voice data. As may be appreciated, via the twelfth communication 750 and the thirteenth communication 752, the UE 702 sends a handover complete message via the target UTRAN/GERAN to the MSC-server 712.

In some embodiments, the UE 702 detects 754 the SRVCC handover to the target UTRAN/GERAN 714 based on a 5G SRVCC indication received in a handover command and suspends non-GBR QoS flows. Moreover, all other QoS flows (e.g., GBR and voice) may be released. The UE 702 detecting 754 the SRVCC handover, suspending non-GBR QoS flows, and releasing all other flows may be performed in parallel or before the twelfth communication 750 and the thirteenth communication 752.

In certain embodiments, in a fourteenth communication 756 from the MSC-server 712 to the SRVCC-IWF 710, the MSC-server 712 sends a SRVCC PS to CS complete notification message to the SRVCC-IWF 710. In some embodiments, in a fifteenth communication 758 from the SRVCC-IWF 710 to the MSC-server 712, the SRVCC-IWF 710 acknowledges the SRVCC PS to CS complete notification message by sending a SRVCC PS to CS complete acknowledge message to the MSC-server 712.

In various embodiments, in a sixteenth communication 760 from the SRVCC-IWF 710 to the AMF 706, the SRVCC-IWF 710 sends a forward relocation complete notification message to the AMF 706.

In some embodiments, in a seventeenth communication 762 from the AMF 706 to the SRVCC-IWF 710, the AMF 706 acknowledges MME with a relocation complete acknowledge message sent to the SRVCC-IWF 710. In certain embodiments, a timer in the AMF 706 may be started to supervise a time in which resources in the RAN 704 and PGW-C+SMF are to be released.

In various embodiments, in an eighteenth communication 764 from the AMF 706 to the SMF 708, the AMF 706 sends a Nsmf_PDUSession_UpdateRequest (or any other suitable message on the SBI) to the SMF 708 (e.g., PGW-C+SMF) for each PDU session associated with 3GPP access with a 5G SRVCC indication.

In certain embodiments, the SMF 708 (or SMFs) detect 766 a SRVCC handover based on the 5G SRVCC indication and separate QoS flows related to IMS voice, GBR, and non-GBR QoS flows. In such embodiments, the non GBR QoS flows are suspended and the SMF 708 stores the non-GBR QoS flow contexts. Moreover, the IMS voice QoS flows and the GBR QoS flows are released.

In some embodiments, in a nineteenth communication 768 from the SMF 708 to a UPF 770, the SMF 708 sends an N4 session modification request message (e.g., N4 session ID) to the UPF 770 to facilitate release of the IMS voice and GBR QoS flows. In such embodiments, in response to all flows of the SMF 708 being released, the SMF 708 may send a N4 session release message to the UPF 770 instead.

In certain embodiments, in a twentieth communication 772 from the UPF 770 to the SMF 708, the UPF 770 may perform a requested action and acknowledge an N4 request.

In various embodiments, in a twenty-first communication 774 from the SMF 708 to the AMF 706, the SMF 708 may send a Nsms_PDUSession_UpdateResponse to the AMF 706 to indicate that the QoS flow update due to 5G SRVCC handover is complete.

In some embodiments, in a twenty-second communication 776 between the UE 702 and the MSC-server 712, for non-emergency sessions and if the HLR is to be updated (e.g., if the IMSI is authenticated but unknown in the VLR), the MSC-server 712 may perform a TMSI reallocation towards the UE 702 using its own non-broadcast LAI and, if the MSC-server 712 and other MSC-server/VLRs serve the same (target) LAI, with its own NRI. In certain embodiments, the TMSI reallocation is performed by the MSC-server 712 towards the UE 702 via a target MSC-server. In various embodiments, for emergency services sessions the HLR may not be updated. In some embodiments. TMSI reallocation may be performed based on an IMSI presence.

In certain embodiments in a twenty-third communication 778 from the MSC-server 712 and an HSS/HLR 780, for non-emergency sessions, in response to the MSC-server performing a TMSI reallocation in the twenty-second communication 776, and if the TMSI reallocation was completed successfully, the MSC-server 712 may perform a map update location to the HSS/HLR 780.

In certain embodiment, for emergency sessions if an emergency service session after handover is complete, the AMF 706 or the MSC-server 712 may send a subscriber location report carrying the identity of the MSC-server 712 to a GMLC associated with the source or target side, respectively, as defined in 3GPP TS 23.271, to support location continuity.

Figure 8:
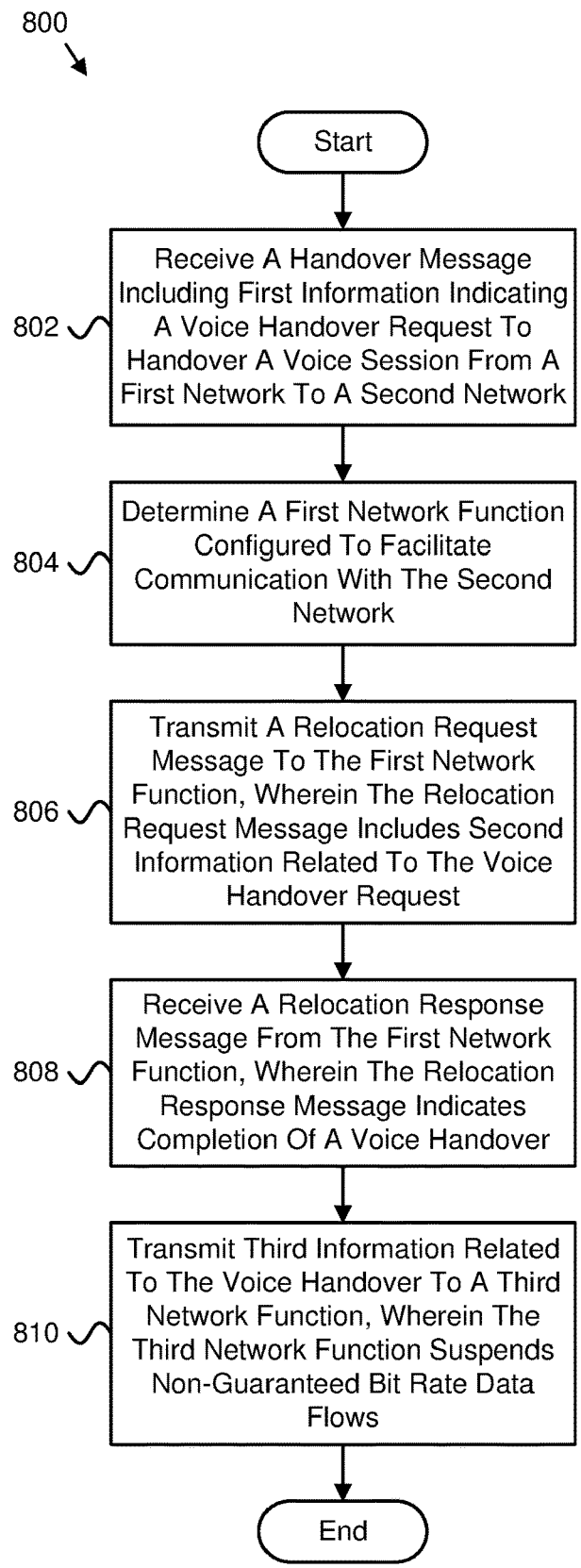
FIG. 8 is a schematic flow chart diagram illustrating one embodiment of a method for voice session handover.

FIG. 8 is a schematic flow chart diagram illustrating one embodiment of a method 800 for voice session handover. In some embodiments, the method 800 is performed by an apparatus, such as the network unit 104. In certain embodiments, the method 800 may be performed by a processor executing program code, for example, a microcontroller, a microprocessor, a CPU, a GPU, an auxiliary processing unit, a FPGA, or the like.

The method 800 may include receiving 802 a handover message including first information indicating a voice handover request to handover a voice session from a first network to a second network. In various embodiments, the method 800 includes determining 804 a first network function configured to facilitate communication with the second network. In certain embodiments, the method 800 includes transmitting 806 a relocation request message to the first network function, wherein the relocation request message includes second information related to the voice handover request. In some embodiments, the method 800 includes receiving 808 a relocation response message from the first network function, wherein the relocation response message indicates completion of a voice handover. In various embodiments, the method 800 includes transmitting 810 third information related to the voice handover to a third network function, wherein the third network function suspends non-guaranteed bit rate data flows.

In one embodiment, the third network function includes a session management function. In a further embodiment, the first network includes another (e.g., different) mobile network technology or a newer generation network (e.g., 5G) than the second network (e.g., 3G, 2G). In other words, the second network may be an older generation network than the first network. In certain embodiments, the first network function includes a single radio voice call continuity interworking function. In various embodiments, the method 800 includes transmitting fourth information related to the voice handover to a radio access network. In some embodiments, the method 800 includes transmitting fifth information related to the voice handover to a remote unit.

Figure 9:
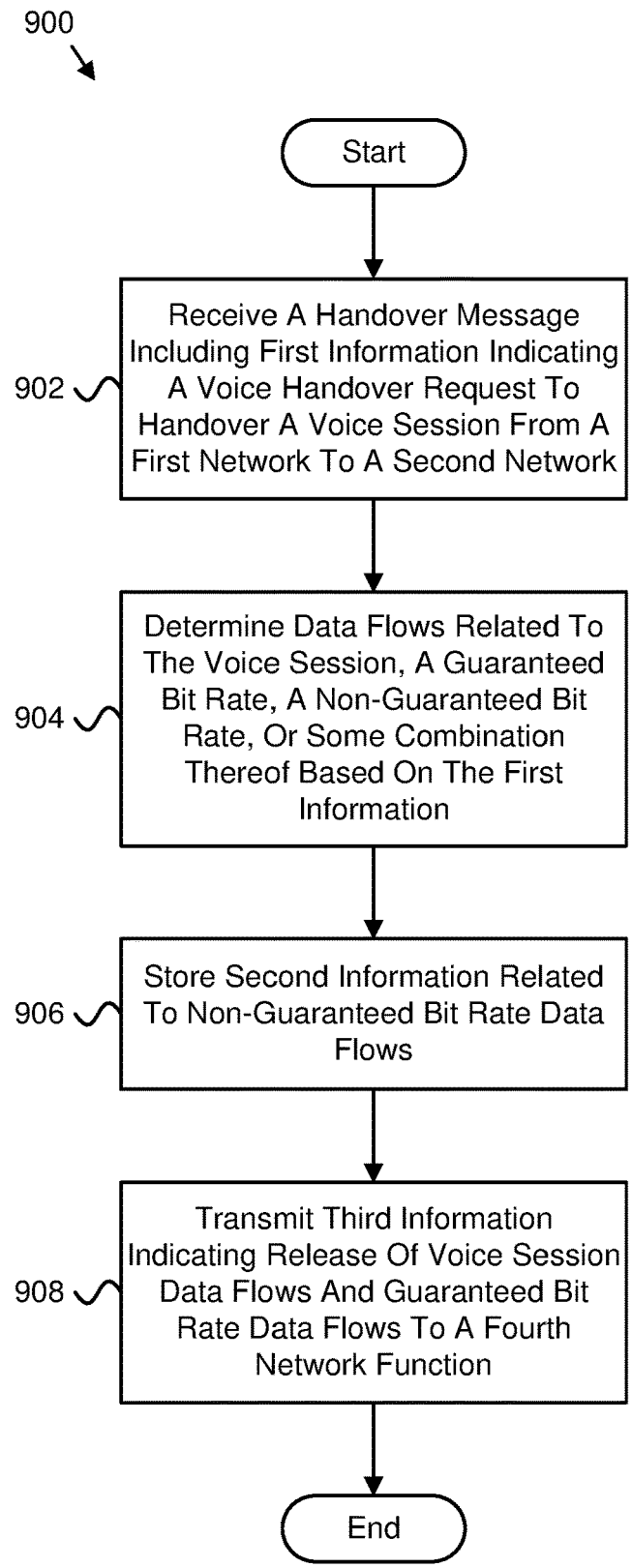
FIG. 9 is a schematic flow chart diagram illustrating another embodiment of a method for voice session handover.

FIG. 9 is a schematic flow chart diagram illustrating another embodiment of a method 900 for voice session handover. In some embodiments, the method 900 is performed by an apparatus, such as the network unit 104. In certain embodiments, the method 900 may be performed by a processor executing program code, for example, a microcontroller, a microprocessor, a CPU, a GPU, an auxiliary processing unit, a FPGA, or the like.

The method 900 may include receiving 902 a handover message including first information indicating a voice handover request to handover a voice session from a first network to a second network. In various embodiments, the method 900 includes determining 904 data flows related to the voice session, a guaranteed bit rate, a non-guaranteed bit rate, or some combination thereof based on the first information. In certain embodiments, the method 900 includes storing 906 second information related to non-guaranteed bit rate data flows. In some embodiments, the method 900 includes transmitting 908 third information indicating release of voice session data flows and guaranteed bit rate data flows to a fourth network function.

In one embodiment, the method 900 includes deleting context information related to the voice session data flows and the guaranteed bit rate data flows. In a further embodiment, the first network includes another (e.g., different) mobile network technology or a newer generation network than the second network. In certain embodiments, the fourth network function includes a user plane function.

Figure 10:
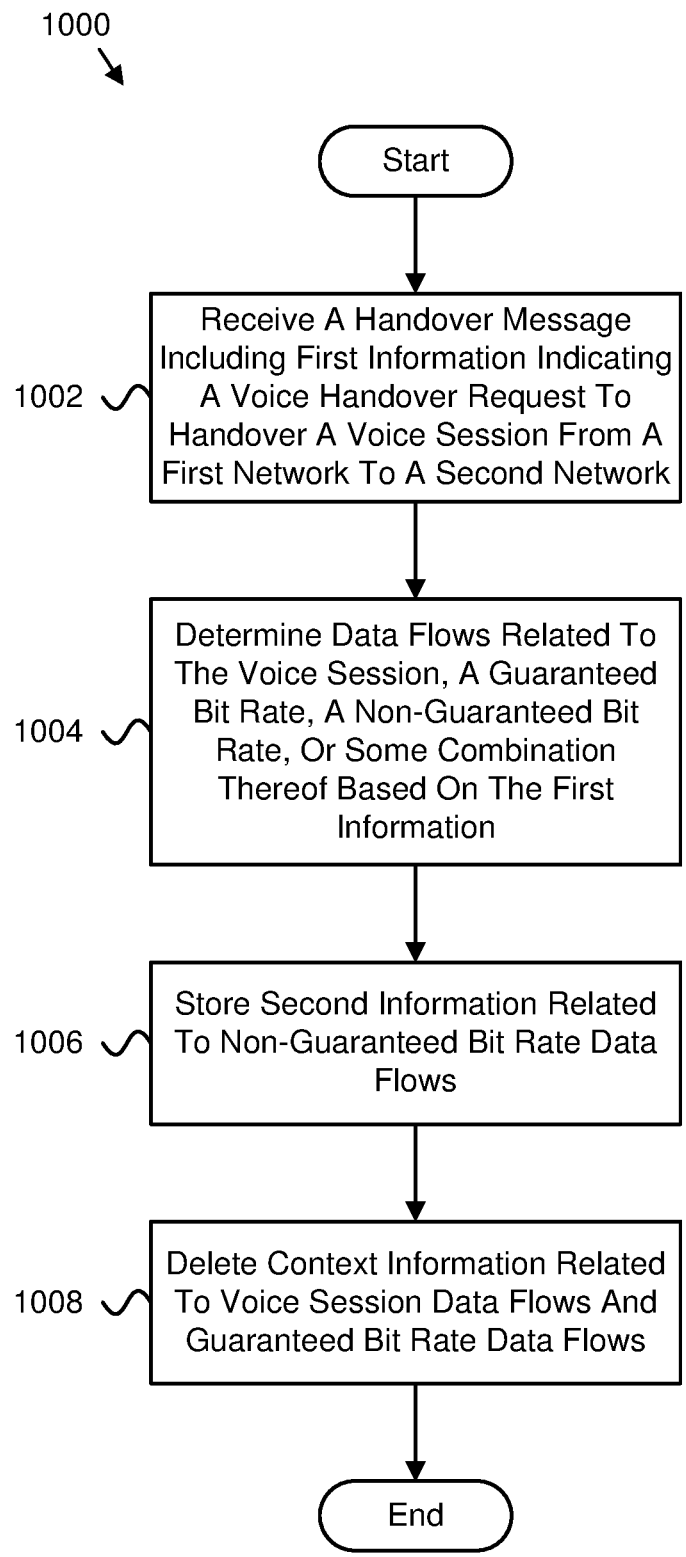
FIG. 10 is a schematic flow chart diagram illustrating a further embodiment of a method for voice session handover.

FIG. 10 is a schematic flow chart diagram illustrating a further embodiment of a method 1000 for voice session handover. In some embodiments, the method 1000 is performed by an apparatus, such as the remote unit 102. In certain embodiments, the method 1000 may be performed by a processor executing program code, for example, a microcontroller, a microprocessor, a CPU, a GPU, an auxiliary processing unit, a FPGA, or the like.

The method 1000 may include receiving 1002 a handover message including first information indicating a voice handover request to handover a voice session from a first network to a second network. In various embodiments, the method 1000 includes determining 1004 data flows related to the voice session, a guaranteed bit rate, a non-guaranteed bit rate, or some combination thereof based on the first information. In certain embodiments, the method 1000 includes storing 1006 second information related to non-guaranteed bit rate data flows. In some embodiments, the method 1000 includes deleting 1008 context information related to voice session data flows and guaranteed bit rate data flows.

In one embodiment, the first network includes another (e.g., different) mobile network technology or a newer generation network than the second network. In a further embodiment, receiving the handover message includes receiving the handover message at a remote unit.

Figure 11:
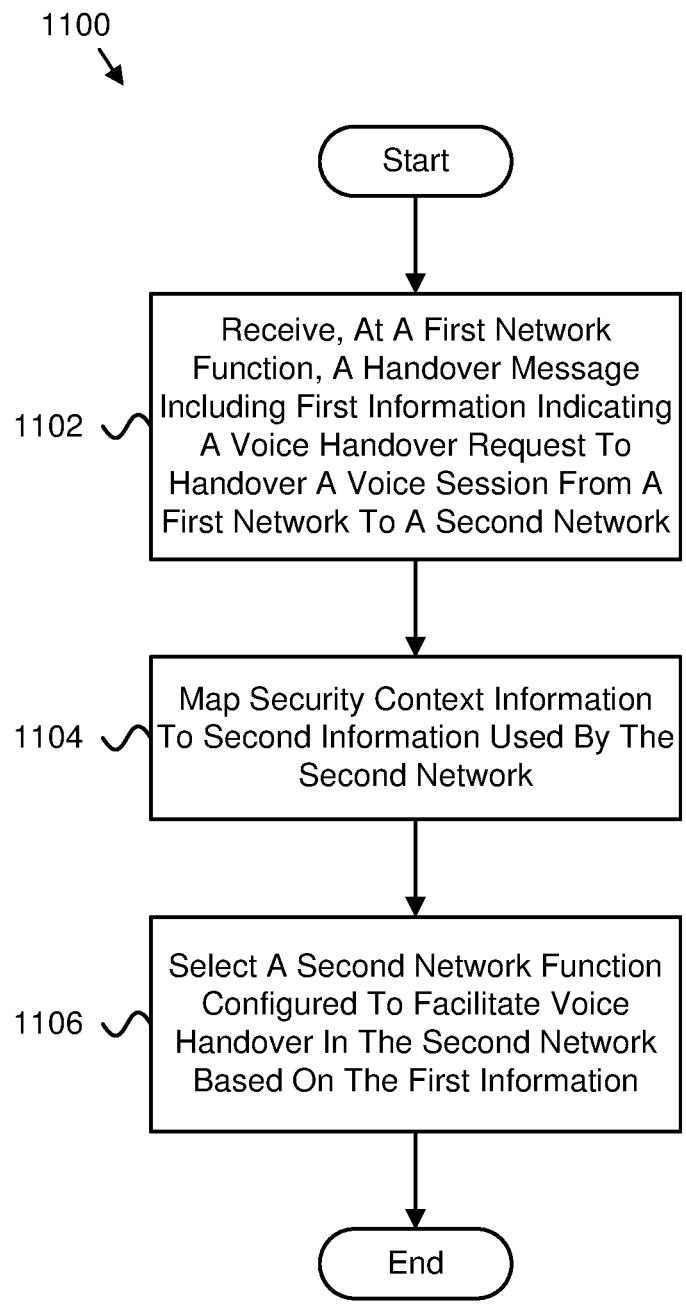
FIG. 11 is a schematic flow chart diagram illustrating yet another embodiment of a method for voice session handover.

FIG. 11 is a schematic flow chart diagram illustrating yet another embodiment of a method 1100 for voice session handover. In some embodiments, the method 1100 is performed by an apparatus, such as the network unit 104. In certain embodiments, the method 1100 may be performed by a processor executing program code, for example, a microcontroller, a microprocessor, a CPU, a GPU, an auxiliary processing unit, a FPGA, or the like.

The method 1100 may include receiving 1102, at a first network function, a handover message including first information indicating a voice handover request to handover a voice session from a first network to a second network. In various embodiments, the method 1100 includes mapping 1104 security context information to second information used by the second network. In certain embodiments, the method 1100 includes selecting 1106 a second network function configured to facilitate voice handover in the second network based on the first information.

In one embodiment, the first network includes another (e.g., different) mobile network technology or a newer generation network than the second network. In a further embodiment, the first network function includes a single radio voice call continuity interworking function. In certain embodiments, the single radio voice call continuity interworking function includes a mobile management entity that communicates with a core network of the second network without connection to an evolved packet core. In some embodiments, the single radio voice call continuity interworking function includes a mobile management entity that communicates with a core network of the second network without bearer splitting functionality. In certain embodiments, the second network function includes a mobile switching center.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   receiving a handover message comprising first information indicating a voice handover request to handover a voice session from a first network to a second network;

determining a first network function configured to facilitate communication with the second network, wherein the first network function comprises a mobile management entity that communicates with a core network of the second network without at least connecting to an evolved packet core and bearer splitting functionality;

transmitting, to the first network function, a relocation request comprising second information related to the voice handover request; and receiving, from the first network function, a relocation response indicating completion of a voice handover, wherein the first network comprises a different mobile network technology than the second network.

2. The method of claim 1, wherein the first information indicates that the second network has only circuit-switched capabilities.

3. The method of claim 1, further comprising transmitting, from a second function of the first network to a third function of the first network, third information related to the voice handover to suspend non-guaranteed bit rate data flows.

4. An apparatus comprising:
a receiver that receives a handover message comprising first information indicating a voice handover request to handover a voice session from a first network to a second network;
a processor that determines a first network function configured to facilitate communication with the second network, wherein the first network function comprises a mobile management entity that communicates with a core network of the second network without at least connecting to an evolved packet core and bearer splitting functionality; and
a transmitter that transmits, to the first network function, a relocation request comprising second information related to the voice handover request;
wherein:
the receiver receives, from the first network function, a relocation response indicating completion of a voice handover; and
the first network comprises a different mobile network technology than the second network.

5. A method comprising:
receiving, at a single radio voice call continuity interworking function, a handover message comprising first information indicating a voice handover request to handover a voice session from a first network to a second network, wherein the single radio voice call continuity interworking function comprises a mobile management entity that communicates with a core network of the second network without at least connecting to an evolved packet core and bearer splitting functionality;

mapping security context information to second information used by the second network; and selecting, via the single radio voice call continuity interworking function, a mobile switching center server configured to facilitate voice handover in the second network based on the first information.

6. The method of claim 5, wherein the first network comprises a different mobile network technology than the second network.

7. An apparatus comprising:
a receiver that receives, at a single radio voice call continuity interworking function, a handover message comprising first information indicating a voice handover request to handover a voice session from a first network to a second network, wherein the single radio voice call continuity interworking function comprises a mobile management entity that communicates with a core network of the second network without at least connecting to an evolved packet core and bearer splitting functionality; and
a processor that:
maps security context information to second information used by the second network; and
selects, via the single radio voice call continuity interworking function, a mobile switching center server configured to facilitate voice handover in the second network based on the first information.

8. The apparatus of claim 7, wherein the first network comprises a different mobile network technology than the second network.

9. The apparatus of claim 7, wherein the singe radio voice call continuity interworking function is not aware of any locations of any user equipment of the first network or the second network.

* * * * *